US010444387B2

(12) United States Patent
Brandsaeter et al.

(10) Patent No.: US 10,444,387 B2
(45) Date of Patent: Oct. 15, 2019

(54) MONITORING MICROSEISMIC EVENTS

(71) Applicant: OCTIO AS, Bergen (NO)

(72) Inventors: Helge Brandsaeter, Hamresanden (NO); John Even Lindgård, Harstad (NO); Tatiana Matveeva, Laksevåg (NO)

(73) Assignee: OCTIO AS, Bergen (NO)

( * ) Notice: Subject to any disclaimer, the term of this patent is extended or adjusted under 35 U.S.C. 154(b) by 49 days.

(21) Appl. No.: 15/526,084

(22) PCT Filed: Nov. 5, 2015

(86) PCT No.: PCT/NO2015/050204
§ 371 (c)(1),
(2) Date: May 11, 2017

(87) PCT Pub. No.: WO2016/076729
PCT Pub. Date: May 19, 2016

(65) Prior Publication Data
US 2017/0307771 A1  Oct. 26, 2017

(30) Foreign Application Priority Data
Nov. 14, 2014 (NO) .................................. 20141369

(51) Int. Cl.
*G01V 1/28* (2006.01)
*G01V 1/00* (2006.01)
(Continued)

(52) U.S. Cl.
CPC .............. *G01V 1/288* (2013.01); *G01V 1/008* (2013.01); *G01V 1/24* (2013.01); *G01V 1/305* (2013.01)

(58) Field of Classification Search
CPC .......... G01V 1/008; G01V 1/24; G01V 1/288; G01V 1/305
See application file for complete search history.

(56) References Cited

U.S. PATENT DOCUMENTS 9,229,124 B2 *  1/2016  Leaney .................. G01V 1/364
9,448,313 B2 *  9/2016  Hofland ................. G01V 1/306
(Continued)

FOREIGN PATENT DOCUMENTS

WO   2008/033797   3/2008
WO   2013/119598   8/2013

OTHER PUBLICATIONS

International Search Report issued in PCT/NO2015/050204, dated Jan. 2, 2016, pp. 1-2.
(Continued)

*Primary Examiner* — Bryan Bui
(74) *Attorney, Agent, or Firm* — Jeffrey S. Melcher; Melcher Patent Law PLLC

(57) ABSTRACT

A system (100) for monitoring a subterranean structure comprises an array (10) with n acoustic sensors capable of detecting P-waves and/or S-waves from the subterranean structure and a central controller (120) for receiving a signal (X) from the sensors. The system further comprises a lookup table (20) comprising a pre-computed travel time curve (24) expressed as relative arrival times of a signal from a location ($L_m$) to each of the sensors (1-n); a comparison unit for comparing the received signal (X) with the pre-computed travel time curve (24), and means for raising an alarm if the received signal (X) matches the precomputed travel time curve (24). Preferably, the alarm is raised if a computed semblance value (26, 27) exceeds a predefined threshold. The system may monitor several locations ($L_m$) in parallel using a fraction of the computer resources and time required by prior art techniques.

18 Claims, 5 Drawing Sheets

(51) Int. Cl.
*G01V 1/24* (2006.01)
*G01V 1/30* (2006.01)

(56) References Cited

U.S. PATENT DOCUMENTS

| | | |
|---|---|---|
| 2006/0047431 A1 | 3/2006 | Geiser |
| 2006/0062084 A1 | 3/2006 | Drew |
| 2008/0068928 A1* | 3/2008 | Duncan .................. G01V 1/288 367/73 |
| 2009/0010104 A1 | 1/2009 | Leaney |
| 2009/0067287 A1 | 3/2009 | Berkovitch |
| 2010/0262373 A1* | 10/2010 | Khadhraoui ............. G01V 1/40 702/16 |
| 2010/0302905 A1 | 12/2010 | Meunier |
| 2013/0088940 A1 | 4/2013 | De Cacqueray |
| 2013/0100769 A1 | 4/2013 | Riley |
| 2014/0019057 A1 | 1/2014 | Diller |

OTHER PUBLICATIONS

Norwegian Search Report issued in Norwegian Patent Application No. 20141369, dated Feb. 10, 2015, pp. 1-2.

* cited by examiner

MONITORING MICROSEISMIC EVENTS

FIELD OF THE INVENTION

The present invention concerns a system and a method for real-time monitoring of a subterranean structure.

PRIOR AND RELATED ART

A dam, a subterranean region in the vicinity of a geothermal facility and a reservoir for oil and/or gas during operation are examples of sites where it may be desirable to monitor a stress regime in the subsurface and issue an alarm, preferably soon enough to avoid harm to installations or personnel on the site. In the following description, an offshore production field for oil/and or gas is used as an example. However, the invention is not limited to offshore oil or gas fields.

An offshore oil and/or gas field comprises several rock layers starting from a seafloor at, for example, a few hundred meters depth. The rock layers have different density, they are generally oriented with varying inclinations, and they can be displaced relative to each other in fault zones within a region of interest. The hydrocarbons are typically embedded in a porous rock layer covered by a non-porous rock.

In some fields, the pressure from the rock and water above the reservoir is sufficient to force the hydrocarbons into a riser extending from a production well to a production platform. However, the reservoir is often stimulated by injecting water and/or gas from a stimulation well in order to force the hydrocarbons toward the production well. Change in the stress regime of the reservoir and overburden may lead to crack, shift of layers relative to each other along existing fault zones etc. Generated microseismic events can be registered by a surface and/or borehole array and may be used to estimate the stress regime of the reservoir and optimize production.

Another example relates to so-called no deposit requirements, e.g. stating that neither drill cuttings, which are generally free from oil, nor produced water nor other material that may contain oil, can be deposited directly to the sea. Cleaning material contaminated with oil to an oil concentration below a limit required by law or company standards to release it to the sea can be unprofitable. Thus, a typical solution involves some cleaning, and depositing a waste containing hydrocarbons, water and solid particles. Depositing waste from an offshore field in an onshore land fill may be ten times as expensive as injecting the waste locally in a subterranean structure, so the latter is preferred. However, depositing drill cuttings and oil contaminated waste in an offshore subterranean structure causes a need for monitoring the structure to ensure that the contaminated waste does not leak into the sea.

More particularly, in both examples above there is a need to monitor a subterranean structure associated with a specific, bounded geological structure for stresses, cracks etc. that could adversely influence the production of an oil filed, cause harm or otherwise have a negative effect on operations. For better understanding the invention, a brief discussion on prior art seismic techniques is provided in the next few paragraphs.

Older marine seismic techniques involve an active seismic source and long streamers towed behind a vessel. The active seismic source emits acoustic waves with sufficient power to penetrate into the ground, where they are reflected and refracted at the interfaces of different rock layers. The return signals picked up at the streamers are pressure waves (P-waves) only, as shear waves (S-waves) cannot travel through the water. Such techniques may still be used to establish or validate a geophysical model of a site. However, the time from shooting to available result is typically six months, rendering such methods unfit for real-time applications. Other disadvantages for these methods in the present context include time and cost for hiring a seismic vessel, getting the vessel to the field, potential harm on marine life and fisheries due to the powerful acoustic shocks and towing streamers near installations on a field.

Later improvements in active source systems include picking up S-waves in addition to the P-waves, e.g. by placing geophones on the seafloor in marine applications or on the ground in land based applications, and replacing a powerful acoustic shock with a series of less powerful acoustic shocks in so-called Vibroseis applications. Regardless of method, systems with an active source require energy to map the underground. As indicated above, acoustic energy supplied in short, powerful bursts may cause harm. Lowering the supplied power increases the charging time, i.e. the time needed to collect the energy required to emit an acoustic wave, even in a Vibroseis-application. Thus, low power may increase the response time, which is an obvious disadvantage in an early warning system. Moreover, if the energy is supplied as electric power, connectors and fittings for subsea conditions may be required. The cost of pressure tight cables and connectors increase with depth of operation.

For the above and other reasons, much effort has been put into microseismic monitoring during the last few decades. In contrast to seismic methods using an active source, microseismic techniques involve listening for seismic events, e.g. indicating a crack or a shift along an existing fault, at times that are not known in advance. Thus, microseismic techniques reduce the need for seismic vessels, and also allow continuous monitoring etc. Signals, typically both P-waves and S-waves, are constantly monitored to determine if an event occurred, i.e. determining is a signal is significant with respect to noise. Furthermore, if an event is detected, the signals from the several sensors are analysed to determine the location, size and character of the event.

Several techniques for recognising and characterising microseismic events, in particular as used for shale oil, are disclosed in, for example, U.S. Pat. Nos. 7,391,675, 8,494, 777B2, WO2010080366A1, US20110295510 and WO2013119598A2.

Common to these prior art techniques is their use of computation intensive algorithms, for example moment tensor inversion, to determine the location, size, character and/or other parameters of the event. Thus, these techniques are either difficult to implement in a real-time early warning system, or they require massive computer resources.

An objective of the present invention is to provide a simplified and improved system and method for monitoring a subterranean structure that solves at least one of the problems above while retaining the benefits of prior art. More particularly, the objective is to provide efficient real-time monitoring of a subterranean structure in an early warning and alarm system.

SUMMARY OF THE INVENTION

This is achieved by a system according to claim 1 and a method according to claim 9.

In a first aspect, the invention concerns a system for monitoring a subterranean structure. The system comprises an array with a plurality of acoustic sensors capable of detecting P-waves and/or S-waves from the subterranean structure and a central controller for receiving a signal from the sensors. The system is distinguished by a lookup table comprising a pre-computed travel time curve expressed as relative arrival times of a signal from a location to each of the sensors and a comparison unit for comparing the received signal with the pre-computed travel time curve and means for raising an alarm if the received signal matches the pre-computed travel time curve.

Comparing a signal on n channels along a pre-computed travel time curve allows real-time comparison for a limited number of selected regions of particular interest, e.g. locations in which a crack would increase the risk for leakage from a subterranean reservoir beyond an acceptable level.

Several such locations can be monitored by the system.

In a preferred embodiment, the comparison unit computes a semblance for each location and compares the semblance to a predefined threshold value for the location. The semblance is a well known measure for coherence between groups of data recordings.

In a further preferred embodiment, the threshold value is based on historical data and semblance values. In particular, the threshold value is selected to reduce the probability for raising an alarm at insignificant events and for detecting false positives, and the threshold may be adjusted as more empiric data become available.

The semblance is preferably computed at predefined intervals. When the semblance is computed, the window length could typically equal the length of a wavelet stemming from microseismic events. The intervals between comparisons are preferably sufficiently small to cause overlap between consecutive windows. This has the effect of providing a window sliding along the received signal and raising an alarm whenever the content of the window matches the pre-computed travel time curve.

If desired, the alarm can be used to trigger further action, e.g. changing pumping rate, stopping the injection pending further analysis, etc.

In a second aspect, the invention concerns a method for monitoring microseismic events, comprising the steps of: selecting a discrete number of locations in a subterranean structure; computing a travel time curve for each discrete location by estimating travel times from the location to each sensor in an array with n acoustic sensors; comparing the travel time curve with a continuous signal received by the sensors; and raising an alarm if the received signal matches the pre-computed travel time curve.

The method is preferably implemented in a system as described previously, and has similar features and benefits.

Thus, the comparison preferably includes computing a semblance for each location and comparing the semblance to a predefined threshold for the location.

In an embodiment using semblance, the semblance is preferably computed using a fixed window length around the pre-computed travel time curve. If this length is W, comparing the window with the pre-computed travel time curve at time intervals W/2 apart ensures a continuous, real-time monitoring.

The travel times and signal may regard P-waves, S-waves or both. For example, an event indicated by a primary or pressure wave may be confirmed by a semblance calculated from a subsequently arriving secondary or shear wave, increasing the reliability of the indication.

Similarly, the level of background noise and/or the signal-to-noise-ratio may affect the reliability of an indicated event. Thus, in a preferred embodiment the alarm is assigned a severity level depending on one or more factors selected from the group comprising noise level, signal-to-noise-ratio, the number of indications detected by independent sensors and the number of indications detected by independent arrays.

BRIEF DESCRIPTION OF THE DRAWINGS

The invention will be described in greater detail by means of an exemplary embodiment with reference to the accompanying drawings, in which.

DETAILED DESCRIPTION

Figure 1:
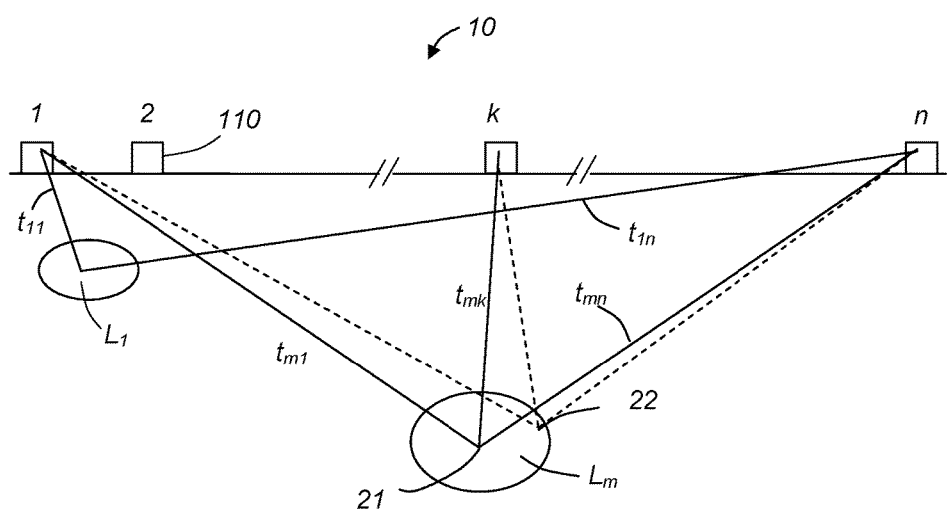
FIG. 1 illustrates a structure with discrete regions of interest and a sensor array.

The drawings are schematic and simplified to illustrate the invention. Thus, they are not to scale, and numerous details are omitted for clarity.

An aim of the present invention is to provide a monitoring system for early warning of a seismic event occurrence in a region of particular interest. In the following, the system is described in the context of injecting waste into a subterranean structure offshore. However, the invention is not limited to that particular application.

Such a monitoring system can be used in so called passive and active mode. In active mode a seismic source is deployed on the surface and fired in a regular grid in order to image the subsurface by recorded reflections. In passive mode the system records data 24/7 comprising noise and signal stemming from the water column, installations on the surface as well as the subsurface. Methods for processing and interpreting in the subsurface are considered. In particular, the invention outlines a work-flow and procedure in order to provide a first look real-time processing scheme getting monitoring results in real-time, e.g. for control of an injection process. Such injection can cause intended and unintended fracturing of rock formations. As noted in the introduction, Unwanted or unplanned fracturing may open flow paths for fluids to surface or to highly undesirable injection outside the intended zone, and thereby create a situation with negative impact on production and/or significant harm to the environment. Thus, the system and method should provide ample information in order to detect unwanted fracturing.

In order to provide a useful tool providing information in real-time, a first indication/warning of a significant fracture event is provided so that a detailed data-analysis may be performed and/or some other action can be taken, e.g. stopping injection pending further analysis.

Fracturing of rocks leads to so called microseismic events, detectable by acoustic sensors. The principles for measurements of microseismic events are well known and are exploited commercially in, for example, shale-gas or oil exploration as noted above. Therefore, these principles are only referred to herein to the extent they are relevant for the present invention.

In the present example of injection into a reservoir, existing reservoir models are used to predict the confinement boundaries for the subterranean structure or reservoir. The monitoring objectives are related to detection if these predicted confinement boundaries are breached or passed. Particular risk thresholds or intervals can be defined for detailed monitoring in order to provide warning indications. In most cases these boundaries or intervals are limited in extent.

So, in case of fracturing into a risk zone, the fractures generate sound waves traveling to surface. In most cases applying injection, an earth-model for the subsurface being affected is available. This earth-model includes information of layering and the speed of P-waves and S-waves in each layer. In the following, the existence of such a model is assumed.

The model can also be used to predict the travel time for waves going from the fracture point to each sensor using, for example, ray trace modeling.

FIG. 1 illustrates a subterranean structure with an array 10 of seismic sensor modules 110 at a seafloor. The sensors 110 are well known acoustic devices capable of detecting P-waves and/or S-waves, and are not discussed in greater detail herein. Every seismic sensor module 110 is assigned a unique number, here represented by a channel number k in the set of integers 1-$n$. If desired, the array 10 can comprise subterranean sensors, e.g. sensors deployed in wellbores.

In the following description and claims, the term 'location' denotes a region of particular interest within the subterranean structure, for example a developing crack or a fault. FIG. 1 shows examples of two such locations, $L_l$ and $L_m$, respectively.

The locations $L_l$ and $L_m$ are two of a small number of regions of particular interest. In other words, at least one location $L_m$ is assumed in the present invention. Further, each location $L_m$ is determined from a geophysical model of the subterranean structure. The model is known in advance, and is based on surveys, logs, core samples and any other data by methods known in the art.

Denoting a travel time from location $L_m$ to sensor number k as $t_{mk}$, all travel times from location $L_m$ to every sensor number k are computed from the model. For example, all travel times $t_{11}, t_{12}, \ldots t_{1n}$ from $L_l$ to the sensors 1-$n$ are computed. For clarity, only $t_{11}$ to sensor 1 and $t_{1n}$ to sensor n are shown in FIG. 1.

Similarly, travel times $t_{mk}$ from location $L_m$ to all channels k, here all sensors 110, are computed from the model, but only travel times $t_{ml}$, $t_{mk}$ and $t_{mn}$ are shown in FIG. 1. More specifically, these travel times are mean travel times from a central point 21 within location $L_m$. The dotted lines from point 22 illustrate that all travel times t vary within a time window $w_{mk}$ (FIG. 3) due to the extent of the location $L_m$ or uncertainty in the model or both. In some applications, the sensors 110 depicted in FIG. 1 can be a subset of all sensors that are actually available.

Figure 2:
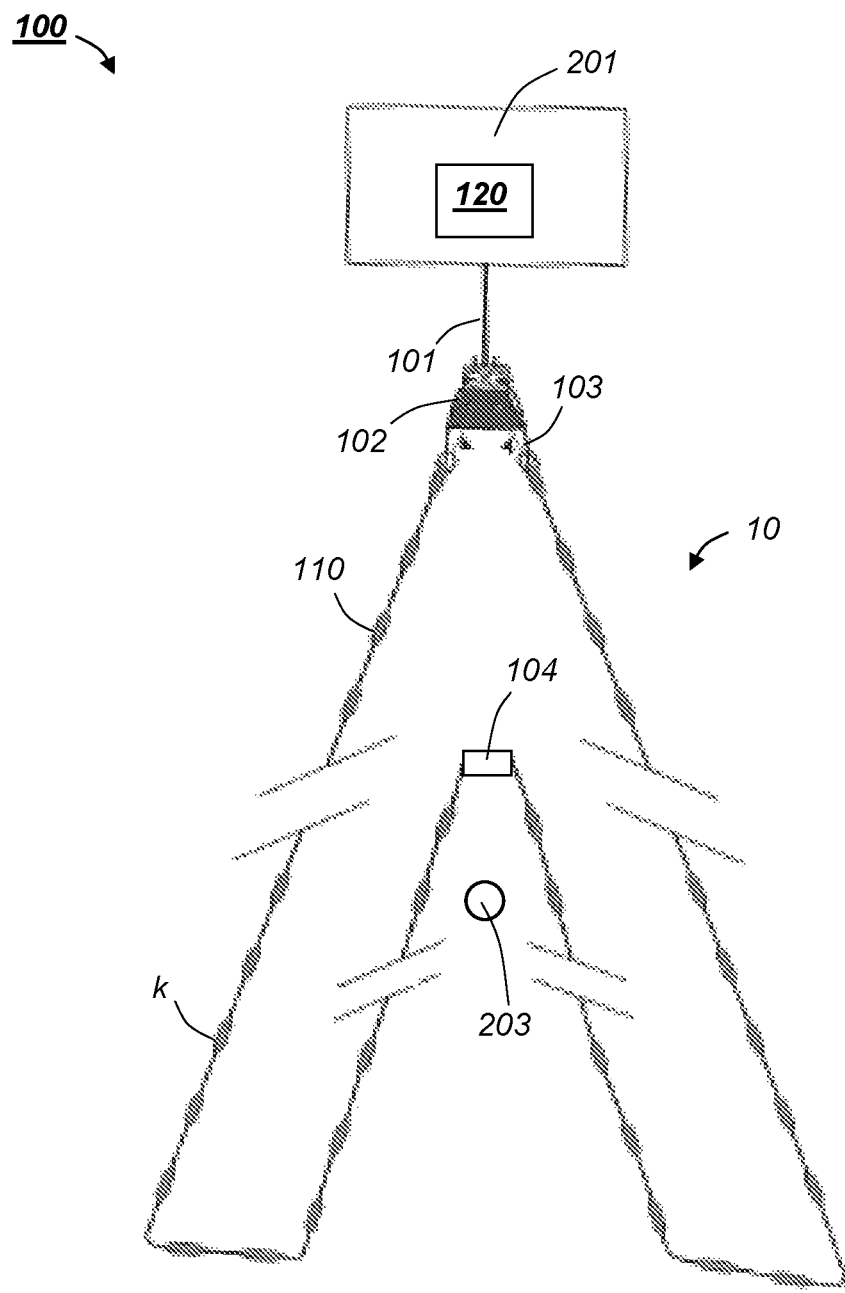
FIG. 2 illustrates a system layout.

FIG. 2 illustrates a system 100 for monitoring a subterranean structure. The main parts of the system 100 are an array 10 of sensor modules 110 connected through an umbilical 101 to a central controller 120. The system 100 is deployed to monitor a subterranean structure as waste from an installation 201 is injected into the structure through a well 203. The installation 201 can be a platform or a subsea facility at the seafloor. The central controller 120 is depicted within the installation 201 for simplicity, and can be located elsewhere. Accordingly, the umbilical 101 is not necessarily connected to the installation 201.

The umbilical 101 supplies power to the sensor modules 110 and convey signals between the array 10 and the central controller 120 through a control unit 102 at the seafloor. A communication line 103 connects the sensor modules 110 to the control unit 102. More particularly, the array 10 comprises two symmetric branches of sensor modules 110 connected to the communication line 104. The branches are connected at their distal ends by an inline connector 104 and at their proximal ends to separate connectors in the control unit 102. The sensor modules 110 are enumerated 1-$n$ as in FIG. 1. It is understood that each sensor module 110 may contain, for example, a hydrophone providing a P-wave signal and a geophone providing an S-wave signal. Accordingly, each channel 1-$n$ may or may not represent a signal from exactly one sensor. However, mapping sensors to channels is trivial.

Figure 3:
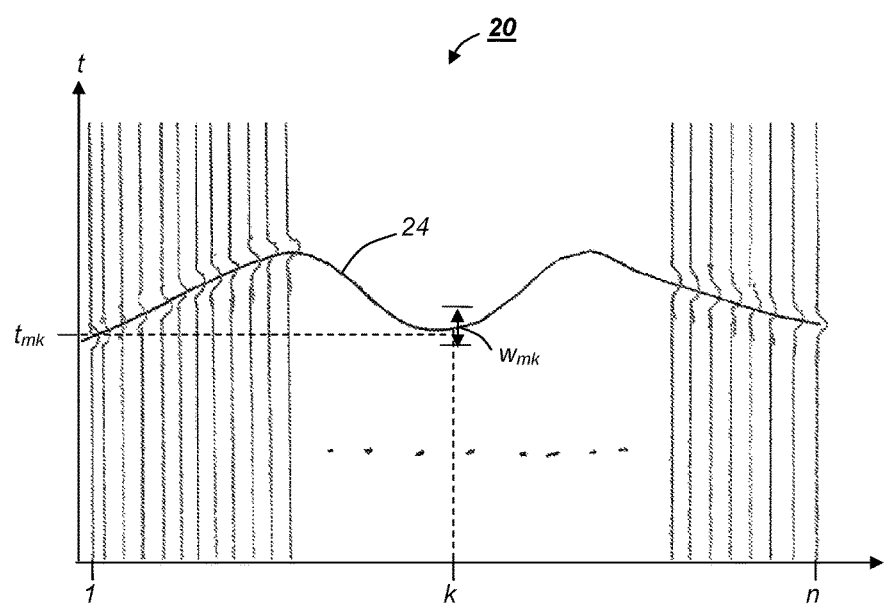
FIG. 3 illustrates a pre-computed travel time curve as a function of sensor number.

FIG. 3 illustrates computed travel time$_{mk}$ as a function of sensor number for a location $L_m$, i.e. a region that has been determined to be of particular interest as explained above. For example P- or S-wave will arrive at sensor k from source m at time $t_{mk}$. The relative arrival times at the sensors, i.e. the shape of a travel time curve 24, may indicate whether a P-wave or S-wave from location $L_m$ is received by the array of sensors 1-$n$. The travel time curve 24 is an imaginary curve through the dataset recorded by a set of selected sensors 1-$n$. When shape of P- or S-wave arrival times from event m at all selected nodes coincides with the shape of the computed travel time curve for event m, an alarm should be raised. A window around travel times can be one fixed value independent of source and sensor type. However, setting different windows for different sources and/or different sensors is/are possible according to the invention.

The resulting travel time curve 24 is stored in a lookup table 20 associated with the central controller 120 for future use. The lookup table 20 can, for example, be implemented as a mask in a buffer, either in a memory in a general computer or in dedicated hardware as further explained below.

Figure 4:
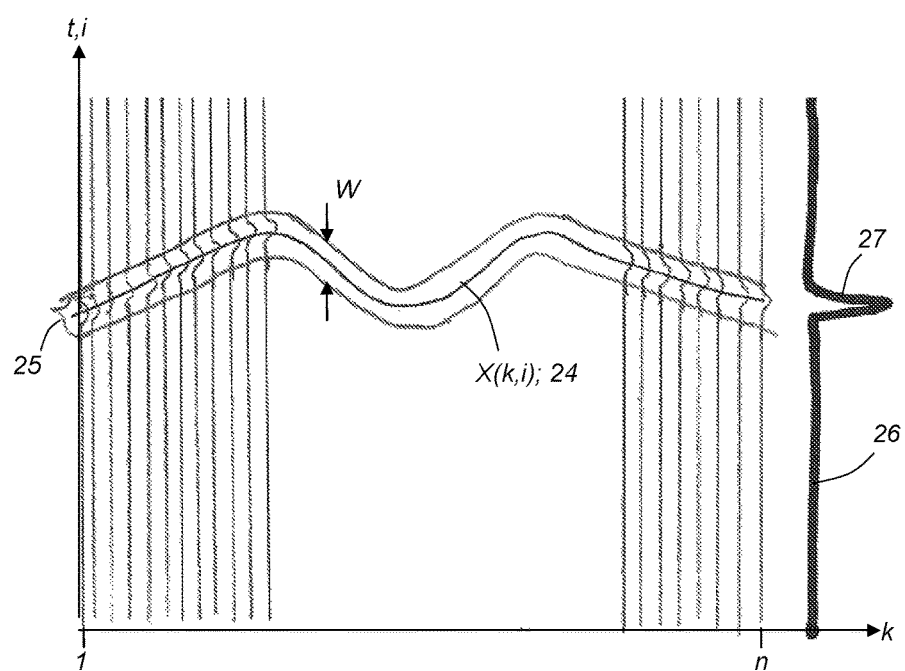
FIG. 4 illustrates comparing a incoming signal with the pre-computed curve.

As noted above, the system 100 may also be operated in an active mode where an active source provides a signal at known points in space and time. This mode may require a source vessel as described in the introduction, and can, for example, be used to update or –verify the model, calibrate the sensor array, etc. Also as indicated above, the active mode is less suited for continuous monitoring than the passive mode. So far, the travel times and associated travel time curves are computed from the established model. FIG. 4 illustrates a physical signal X(k, i) arriving at the array 10 of sensors 110. The sensor numbers 1-$n$ in FIG. 3 is replaced with channel numbers k∈{1-n} as explained above. The signal on each channel k is sampled to provide data points indexed with integer i. Thus, integer i indexes the signal on each channel k along a time axis t. W is an integer representing the number of sampled data points in a period similar to the window $w_{mk}$ in FIG. 3. However, W is preferably the same integer for all channels 1-$n$ as indicated by the boundaries drawn on both sides of the curve X(k, i).

The signal received through the channels 1-$n$ most likely comprises noise. Noise can be removed using any known technique, e.g. tau-p transform. The output from such processing would typically appear as small oscillations around a zero value with high amplitude wavelets from an incoming signal at the respective sensors as shown in FIG. 4. In particular, an event in location $L_m$ would be expected to arrive at the sensors 1-$n$ at relative arrival times matching the pre-computed travel time curve 24, cf. FIG. 3. As shown in FIG. 4, the signal wavelets arrive at the respective sensors, i.e. in the channels 1-$n$ at times relative to the arrival time 25 in channel 1. Here, a sum of the wavelets would be significantly greater than a sum of noise reduced signals. More particularly, 'the sum of wavelets' could be a sum of positive signals or a sum of squared signals, i.e. energy, received in the intervals W displaced relative to each other according to the pre-computed curve 24 in FIG. 3.

In a preferred embodiment, a comparison unit computes a semblance sum over the channels 1-$n$ along the pre-computed travel time curve 24 at regular intervals. If the semblance sum is computed over channels 1-$n$ carrying noise, a value below the threshold 26 is obtained. If a signal from location $L_m$ is present, the semblance will exceed the threshold value 26 significantly, as illustrated by the peak 27, under certain known conditions. It is understood that the comparison unit corresponds to the final step in a traditional semblance analysis, hence the name. Furthermore, such a peak 27 appears even if the individual 'wavelets' are below the noise level in all channels 1-$n$, as known from semblance theory. Thus, as used herein, the semblance is expressed as:

$$S_c = \frac{\sum_{i=j-W/2}^{j+W/2}\left[\sum_{k=1}^{n} X_{k,i}\right]^2}{\frac{1}{n}\sum_{i=j-W/2}^{j+W/2}\sum_{k=1}^{n}(X_{k,i})^2}$$

where the signal X, indices i, k and fixed integers n and W are as explained above. The sampled signal X(k, i) received through the channels 1-$n$ can represent a P-wave or an S-wave as noted above. If desired, the semblance S may be normalized, i.e. multiplied by a fixed factor.

The semblance curve 26, 27 may be calculated for a defined number of locations or focal points, as well as for both P (pressure wave) and S (shear wave) arrivals.

The required operations can be done very efficiently using well known computational algorithms. For example, the sampled data points can be obtained by a single AND operation between a first-in, first-out buffer containing the signal X(k, i) in n parallel columns and a fixed buffer containing a mask for the pre-computed curve 24. These buffers can be implemented in a generalized computer or in dedicated hardware associated with the central controller 120 (FIG. 2). The remaining additions and multiplications to achieve the semblance are also cheap operations in terms of time and computer resources.

Once the semblance for a location $L_m$ is computed, a simple comparison with a predetermined threshold value suffices to determine whether a micro seismic event may have occurred in location $L_m$, and if so, raise an alarm and/or perform some predetermined action such as obtaining further data from injection pumps and any other available data source, stopping an injection of waste pending further analysis etc.

In contrast, traditional methods typically involve suppressing noise, running STA/LTA detector, picking seismic phases, determining the location and nature of the event to see if an alarm should be raised. These methods may involve moment tensor inversion and other operations demanding large computer resources and/or time. Compared to such methods, the present invention uses a well defined model to identify one or more location(s) of interest, disregarding any other region. Further, several semblances can be computed in series or parallel requiring a fraction of the time and/or computing resources needed for prior art methods. Hence, several locations can be monitored simultaneously and in real-time with the system and method of the invention, at the possible cost of an ability to detect and analyse an event in any region in a monitored structure.

Figure 5:
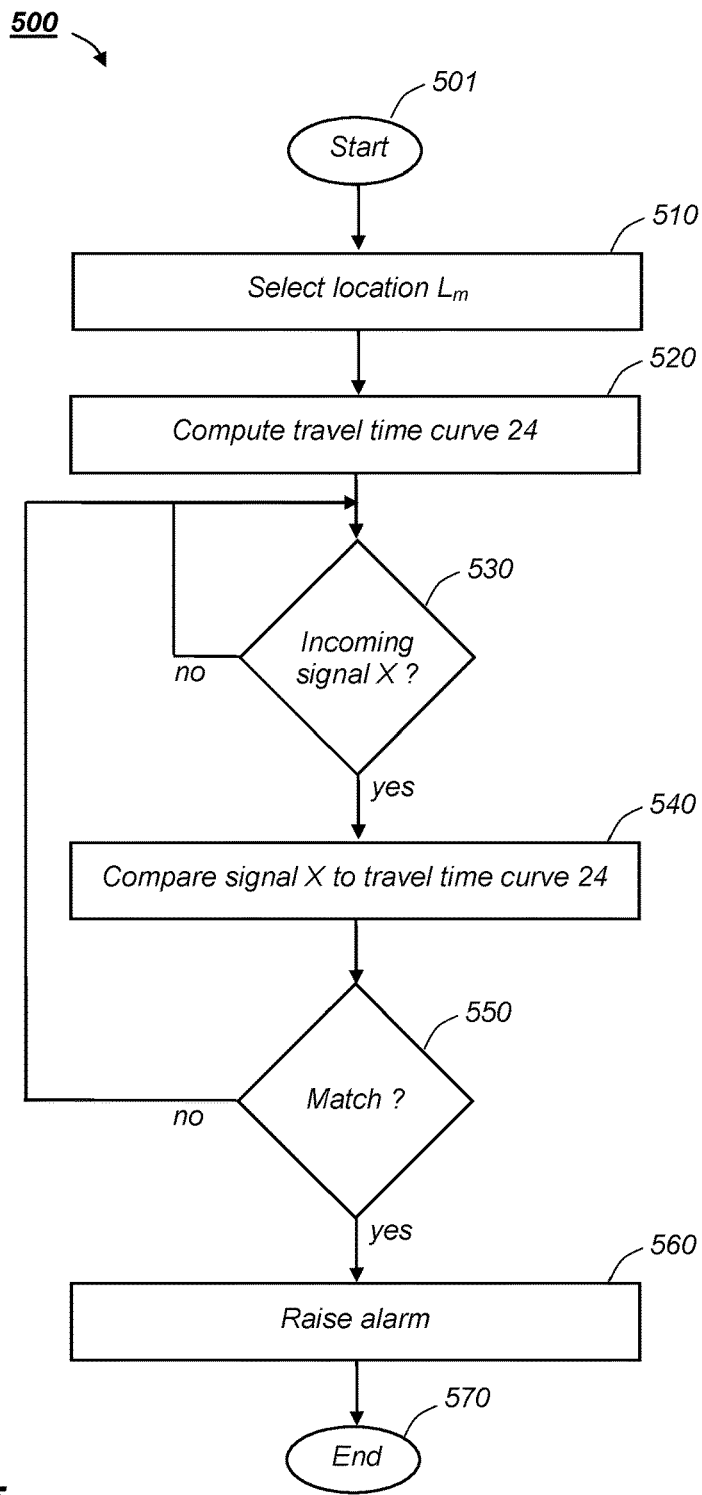
FIG. 5 is a flow chart illustrating a method according to the invention.

FIG. 5 illustrates the main steps of a method 500 according to the invention. Start procedures 501 include obtaining an earth model, deploying sensor modules 10 and other initialisation. In the first step 510 of the method according to the invention, one or a few locations $L_m$ are selected. The selection is based on an existing model of the structure to be monitored.

In step 520, a travel time curve is computed as described above; one curve per location $L_m$.

Branching 530 illustrates a waiting loop. When the system is out of operation, or perhaps in an active mode, there will be no incoming signal and a system implementing the method will wait for an incoming signal. During operation, there will be a continuous signal X from the sensor modules 110 (FIGS. 1 and 2) through n channels k (FIG. 4).

In step 540, possible arrivals in incoming signal X are compared to the travel time curve(s). This step may involve noise reduction by known techniques. In a preferred embodiment, this step includes computing the semblance S as discussed above.

If arrival times of P- or/and S-waves match the pre-computed travel time curve 24, the method proceeds to step 560. If there is no match, the method returns to check for incoming signal, and then compare a next window of the signal X with the curve 24. Thus, step 540 is routinely performed at regular intervals, e.g. with a period of W/2. The period W/2 amounts to continuous monitoring, as is readily seen from FIG. 4.

In step 560 an alarm is raised. This happens whenever the signal X matches the pre-computed curve(s) 24, e.g. if the calculated semblance value exceeds a threshold value as shown at peak 27 in FIG. 4 and explained above.

The monitoring loop represented by steps 530-550 in the method 500 may comprise additional steps for checking more than one location. Alternatively, several such monitoring loops 530-550 may be run in parallel in hardware or software, for example one process per location. The details of implementation are considered obvious to those skilled in the art.

The end procedures 570 may include further actions based on the alarm, for example acquiring further data or stopping injection pending further analysis. For example, available information such as well-head and downhole pressures or pump volumes may provide key information in order to perform preventive actions.

The alarm can be assigned a value for severity or reliability. For example, the reliability or severity of an alarm would increase if an event was indicated by most or all sensors in an array, or by two arrays for P-waves and S-waves respectively. The noise level, either in absolute terms or as a signal-to-noise-ratio, also impact such a reliability attribute. In particular, if the microseismic event is detected with a high level of background noise, the uncertainty increases and the reliability decreases.

While the invention has been described above with reference to examples and certain embodiments, the scope of the invention is determined by the accompanying claims.

The invention claimed is:

1. A system for monitoring microseismic events in a subterranean structure, the system comprising:
   a central controller;
   an array in communication with the central controller, the array comprising a plurality of acoustic sensors configured for continuously detecting at least one signal comprising P-waves and/or S-waves from the subterranean structure, wherein the controller is configured to receive the at least one signal from the array and the array is configured to send the at least one signal to the central controller;

the central controller comprising a lookup table comprising a travel time curve expressed as relative arrival times of the at least one signal from a predetermined location in the subterranean structure to each acoustic sensor in the plurality of acoustic sensors;

the central controller comprising a comparison unit configured for comparing the received at least one signal with the travel time curve; and the central controller is configured for raising an alarm if the received at least one signal matches the travel time curve.

2. The system according to claim 1, comprising several predetermined locations within the subterranean structure.

3. The system according to claim 2, wherein the comparison unit computes a semblance for each predetermined location and compares the semblance to a predefined threshold value for the predetermined location.

4. The system according to claim 1, wherein the comparison unit computes a semblance for the predetermined location and compares the semblance to a predefined threshold value for the predetermined location.

5. The system according to claim 4, wherein the threshold value is based on historical data and semblance values.

6. The system according to claim 4, wherein the semblance is computed at predefined intervals.

7. The system according to claim 1, further comprising means for further action, wherein the means are responsive to a raised alarm.

8. The system according to claim 7, wherein the means for further action includes means for further analysis.

9. The system according to claim 7, wherein the means for further action includes means for stopping an injection.

10. A method for monitoring microseismic events in a subterranean structure comprising the steps of:

continuously detecting at least one signal comprising P-waves and/or S-waves from the subterranean structure by an array comprising a plurality of acoustic sensors;

providing a central controller for receiving the at least one signal and comprising a lookup table comprising a travel time curve expressed as relative arrival times of the at least one signal from a predetermined location in the subterranean structure to each acoustic sensor in the plurality of acoustic sensors, wherein the array is in communication with the central controller;

the array sending the at least one signal to the central controller;

the central controller comparing the travel time curve with the received at least one signal; and the central controller raising an alarm if the received at least one signal matches the travel time curve.

11. The method according to claim 10, wherein the comparison includes computing a semblance for each discrete location and comparing the semblance to a predefined threshold for the discrete location.

12. The method according to claim 11, wherein the semblance is computed using a fixed window length around the travel time curve.

13. The method according to claim 10, wherein the travel times and signals regards P-waves.

14. The method according to claim 10, wherein the travel times and signals regards S-waves.

15. The method according to claim 10, wherein the alarm is assigned a severity level depending on one or more factors selected from the group comprising noise level, signal-to-noise-ratio, the number of indications detected by independent sensors and the number of indications detected by independent arrays.

16. The method according to claim 10, further comprising conducting the method steps in real time to provide the alarm of a seismic event occurring.

17. The method according to claim 16, further comprising providing the alarm to avoid harm to installations or personal caused by the seismic event occurring.

18. The method according to claim 10, further comprising selecting a number of discrete locations in the subterranean structure;

computing a travel time curve for each discrete location by estimating travel times from the each discrete location to each acoustic sensor in the array and storing the time travel curve in the lookup table.

* * * * *